(12) United States Patent
Yokokura et al.

(10) Patent No.: US 9,080,085 B2
(45) Date of Patent: Jul. 14, 2015

(54) PRESSURE-SENSITIVE ADHESIVE COMPOSITION FOR OPTICAL MEMBER AND PROCESSED PRODUCT THEREOF

(75) Inventors: Seiji Yokokura, Sayama (JP); Yuya Yonekawa, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 0 days.

(21) Appl. No.: 14/117,726

(22) PCT Filed: May 15, 2012

(86) PCT No.: PCT/JP2012/062374
§ 371 (c)(1),
(2), (4) Date: Nov. 14, 2013

(87) PCT Pub. No.: WO2012/157630
PCT Pub. Date: Nov. 22, 2012

(65) Prior Publication Data
US 2014/0073733 A1    Mar. 13, 2014

(30) Foreign Application Priority Data
May 17, 2011    (JP) ................ 2011-110187

(51) Int. Cl.
| C09J 133/24 | (2006.01) |
| C08G 18/62 | (2006.01) |
| C08G 18/79 | (2006.01) |
| C09J 175/04 | (2006.01) |
| C08K 5/3492 | (2006.01) |
| C09J 7/02 | (2006.01) |
| C08F 220/20 | (2006.01) |
| C08F 220/28 | (2006.01) |
| C08F 220/56 | (2006.01) |
| C09J 133/06 | (2006.01) |
| C09J 133/26 | (2006.01) |
| C08F 220/18 | (2006.01) |

(52) U.S. Cl.
CPC .............. C09J 133/24 (2013.01); C08F 220/20 (2013.01); C08F 220/28 (2013.01); C08F 220/56 (2013.01); C08G 18/6229 (2013.01); C08G 18/6254 (2013.01); C08G 18/6266 (2013.01); C08G 18/794 (2013.01); C08K 5/34924 (2013.01); C09J 7/0217 (2013.01); C09J 133/066 (2013.01); C09J 133/26 (2013.01); C09J 175/04 (2013.01); *C08F 2220/1825* (2013.01); *C08G 2170/40* (2013.01); *C09J 2203/318* (2013.01)

(58) Field of Classification Search
CPC ...... C09J 133/08; C09J 133/14; C09J 133/24; C09J 133/26
See application file for complete search history.

(56) References Cited

U.S. PATENT DOCUMENTS

| 7,825,189 B2 | 11/2010 | Tomita et al. |
| 2003/0032715 A1 | 2/2003 | Sakaitani et al. |
| 2009/0104445 A1 | 4/2009 | Inoue et al. |
| 2010/0239859 A1* | 9/2010 | Song et al. ............. 428/355 CN |
| 2013/0211028 A1 | 8/2013 | Shinike et al. |

FOREIGN PATENT DOCUMENTS

| CN | 1490372 A | 4/2004 |
| EP | 1956064 A1 | 8/2008 |
| JP | 8193114 A | 7/1996 |
| JP | 200313029 A | 1/2003 |
| JP | 2005247909 A | 9/2005 |
| JP | 2007119667 A | 5/2007 |
| JP | 2007264092 A | 10/2007 |
| JP | 2008156513 A | 7/2008 |
| JP | 2009126929 A | 6/2009 |
| JP | 2009132752 A | 6/2009 |
| JP | 2009144145 A | 7/2009 |
| JP | 2009173772 A | 8/2009 |
| JP | 2012102322 A | 5/2012 |
| WO | 2006137307 A1 | 12/2006 |
| WO | 2008143010 A1 | 11/2008 |
| WO | 2012023567 A1 | 2/2012 |

* cited by examiner

Primary Examiner — Vu A Nguyen
(74) Attorney, Agent, or Firm — The Webb Law Firm

(57) ABSTRACT

A pressure-sensitive adhesive composition for an optical member is obtained by blending 100 parts by weight of an acrylic polymer, which contains 80 to 98.7 parts by weight of (a) a monomer constituted of an alkyl acrylate monomer having an alkyl group of 1 to 12 carbon atoms and/or an aromatic ring-containing acrylic monomer, 0.2 to 1.5 parts by weight of (b) an amide group-containing acrylic monomer and 1 to 5 parts by weight of (c) a hydroxyl group-containing acrylic monomer, with 0.12 to 1 part by weight of (d) an isocyanate-based curing agent having an isocyanurate skeleton as a curing agent, and is characterized by substantially containing no metal chelate-based curing agent. Accordingly, a pressure-sensitive adhesive composition, which has excellent heat resistance and wet heat resistance and whose aging time can be particularly shortened, is provided.

4 Claims, No Drawings

PRESSURE-SENSITIVE ADHESIVE COMPOSITION FOR OPTICAL MEMBER AND PROCESSED PRODUCT THEREOF

CROSS-REFERENCE TO RELATED APPLICATIONS

This application is the United States national phase of International Application No. PCT/JP2012/062374 filed May 15, 2012, and claims priority to Japanese Patent Application No. 2011-110187 filed May 17, 2011, the disclosures of which are hereby incorporated in their entirety by reference.

TECHNICAL FIELD

The present invention relates to a pressure-sensitive adhesive composition for an optical member, which is favorable for sticking an optical member, particularly a polarizing plate, and a processed product thereof. More particularly, the present invention relates to a pressure-sensitive adhesive composition which exhibits excellent heat resistance, wet heat resistance and light leakage prevention property when used for sticking a polarizing plate and whose aging period required prior to sticking with the pressure-sensitive adhesive can be significantly shortened.

BACKGROUND ART

When an optical member such as a polarizing plate is stuck to a liquid crystal display panel, a pressure-sensitive adhesive is generally used. For the pressure-sensitive adhesive for an optical member, there are required various properties, such as (1) heat resistance, that is, even if it is placed under the high temperature conditions, foaming, lifting, peeling, etc. do not occur at the adhesive part, (2) wet heat resistance, that is, even if it is placed under the high temperature and high humidity conditions, foaming, lifting, peeling, etc. do not occur at the adhesive part, (3) light leakage prevention property, that is, even if the optical member undergoes shrinkage under the high temperature conditions to thereby place the pressure-sensitive adhesive having been applied to the optical member under stress, unexpected light leakage is not brought about in the display, and (4) aging property, that is, the number of days between the day the curing agent is added to the pressure-sensitive adhesive composition and the day the curing reaction is completed to stabilize the properties of the pressure-sensitive adhesive is small.

Particularly in the production of polarizing plates used for liquid crystal displays or the like, the aging period of the pressure-sensitive adhesive has great influence on the lead time, and therefore, the aging property is one of important properties among the above properties. In general, the pressure-sensitive adhesive composition for a polarizing plate is mixed with a curing agent, and thereafter, the mixture is processed into a work in process in the form of a roll (three-layer structure of polarizing plate/pressure-sensitive adhesive layer/release film or release film/pressure-sensitive adhesive layer/release film, or the like). In order to complete the curing reaction to exhibit given properties required, this work in process is stored in an aging room preset at 20 to 50° C. (usually 40° C.) for about one week. Thereafter, the work in process is cut to a desired size, then the release film is peeled off, and the work in process is stuck to a liquid crystal cell. Because of such a working process, the longer the storage period in the aging room is, the more the works in process required to be stored are, and the cost of temperature control in the aging room or other running costs are also increased.

Therefore, the need of pressure-sensitive adhesive compositions for polarizing plates, the aging period of which is short and which do not need to be stored in the aging room, has increased.

In these days, as a method to shorten the aging period, there is a method of using a metal chelate-based curing agent as a curing agent or a method of adding a curing accelerator to a monomer mixture before polymerization. A pressure-sensitive adhesive prepared by the use of the metal chelate-based curing agent, however, generally has poor heat resistance, and therefore, use of the metal chelate-based curing agent is not a preferred choice from the viewpoint of durability under the severe conditions.

In the case of adding a curing accelerator, the thickening action of the pressure-sensitive adhesive with time generally appears early and markedly strongly, and thereby, viscosity increase of the coating solution is brought about. Hence, application of the pressure-sensitive adhesive often becomes difficult. In the case where gelation proceeds in early stage and the viscosity of the coating solution of the pressure-sensitive adhesive becomes excessively high as above, smooth coating cannot be carried out unless a pressure-sensitive adhesive coating solution using a large amount of an organic solvent is used, and besides, there also occurs a problem that in order to form a pressure-sensitive adhesive layer, a large amount of an organic solvent must be removed.

Further, there is a case where an amine-based compound is used as such a curing accelerator, but for example, a pressure-sensitive adhesive using a polyhydroxyalkylamine-based curing accelerator is liable to undergo yellowing due to change with time, and such a curing accelerator is unsuitable for use in a pressure-sensitive adhesive for optical use. Furthermore, there is also a case where an amino group-containing monomer is copolymerized to allow the resulting acrylic polymer to have a curing acceleration action, but in the system using such an amino group-containing monomer, the curing reaction excessively proceeds, and as a result, reduction of tack of the resulting pressure-sensitive adhesive is sometimes brought about.

There is also a case where an organometallic compound-based curing accelerator is used, but for example, an organotin compound commonly used as the organometallic compound-based curing accelerator has high toxicity, and in particular, tributyltin contained in dibutyltin dilaurate is an anxious substance as an endocrine disruptor. Also from this viewpoint, use of the organometallic compound-based curing accelerator is not recommended.

On the other hand, according to the prior art literatures, a pressure-sensitive adhesive composition for a polarizing plate, which is capable of sufficiently undergoing curing due to curing reaction in the coating/drying step without needing aging by incorporating a specific amount of a carboxyl group-containing polymer in a mixture of a hydroxyl group-containing polymer, particularly a (meth)acrylic polymer, and an isocyanate-based curing agent, has been disclosed in a patent literature 1. In the patent literature 1, however, studies of light leakage that is an essential evaluation item for pressure-sensitive adhesives for polarizing plates have not been made at all, though durability and aging property of the pressure-sensitive adhesive have been taken into accounts.

In a patent literature 2, there has been disclosed a pressure-sensitive adhesive composition, which comes to have a long pot life, proper tack, small change of tack with time and good durability in the heat treatment by adding an aliphatic isocyanate-based compound and/or a polyfunctional isocyanurate-based compound, and a compound causing keto-enol tautomerism to an acrylic copolymer containing a monomer having a hydroxyl group and a monomer having a carboxyl group. In the patent literature 2, however, studies of durability and light leakage required for pressure-sensitive adhesives for polarizing plates have not been made because a protective film has been supposed as a use purpose of the resulting pressure-sensitive adhesive, though a curing agent having an isocynurate skeleton has been used.

In a patent literature 3, there has been disclosed a pressure-sensitive adhesive composition for an optical member, which can be improved in processability owing to shortening of aging time in the curing treatment by adding a silane compound having an amino group and an isocyanate-based curing agent to an acrylic polymer comprising a monomer having a hydroxyl group and which exhibits durability and reworkability. In this literature, studies of durability and reworkability of the composition as a pressure-sensitive adhesive for a polarizing plate have been also made, and in order to shorten the aging period, an amino group-containing substance has been used.

In the patent literature 3, however, studies of light leakage have not been made, and the pressure-sensitive adhesive composition is insufficient as a pressure-sensitive adhesive for a polarizing plate.

In a patent literature 4, there has been disclosed a pressure-sensitive adhesive composition for an optical member, which is obtained by adding a metal chelate-based curing agent and an isocyanate-based curing agent to an acrylic polymer obtained by copolymerizing a monomer mixture containing at least a monomer having an alkyl group of 1 to 16 carbon atoms and a monomer having a carboxyl group and optionally containing acrylamide. However, the resulting pressure-sensitive adhesive has poor heat resistance and is insufficient as a pressure-sensitive adhesive for a polarizing plate, though the metal chelate-based curing agent contributes to shortening of the aging period of a pressure-sensitive adhesive, as described above.

CITATION LIST

Patent Literature

Patent literature 1: Japanese Patent Laid-Open Publication No. 2008-156513
Patent literature 2: Japanese Patent Laid-Open Publication No. 2005-247909
Patent literature 3: Japanese Patent Laid-Open Publication No. 2009-173772
Patent literature 4: Japanese Patent Laid-Open Publication No. 2009-132752

The present invention has been made on the basis of the above background art, and it is an object of the present invention to provide a pressure-sensitive adhesive composition, which has excellent heat resistance, wet heat resistance and light leakage prevention property when it is used for sticking an optical member such as a polarizing plate and whose aging period can be significantly shortened, and a pressure-sensitive adhesive composition using this composition.

SUMMARY OF THE INVENTION

The pressure-sensitive adhesive composition for an optical member of the present invention is a pressure-sensitive adhesive composition for an optical member which is obtained by blending 100 parts by weight of an acrylic polymer containing 80 to 98.7 parts by weight of (a) a monomer constituted of an alkyl acrylate monomer having an alkyl group of 1 to 12 carbon atoms and/or an aromatic ring-containing acrylic monomer, 0.2 to 1.5 parts by weight of (b) an amide group-containing acrylic monomer and 1 to 5 parts by weight of (c) a hydroxyl group-containing acrylic monomer, with 0.12 to 1 part by weight of (d) an isocyanate-based curing agent having an isocyanurate skeleton as a curing agent, and is characterized by substantially containing no metal chelate-based curing agent.

The pressure-sensitive adhesive composition for an optical member of the present invention contains an acrylic polymer containing a repeating unit derived from an amide group-containing monomer, and by forming a crosslinked structure in this acrylic polymer using an isocyante-based curing agent having an isocyanurate skeleton, the pressure-sensitive adhesive composition exhibits excellent durability, and the aging period required can be significantly shortened.

When a tolylene diisocyanate-based curing agent having positive birefringence is particularly used among the isocyanate-based curing agents having an isocyanate skeleton, optical strain caused by distortion of the pressure-sensitive adhesive accompanying shrinkage of a polarizing plate is corrected, and as a result, light leakage prevention effects are remarkably exhibited. Also by using an aromatic ring-containing acrylic monomer as a constituent of the acrylic polymer, the above-mentioned optical strain can be compensated, and therefore, a pressure-sensitive adhesive composition having more excellent light leakage prevention property can be obtained.

By incorporating a basic functional group such as an amino group in the acrylic polymer, crosslinking reaction between an acrylic polymer produced and a specific curing agent is accelerated, and as a result, the aging period can be significantly shortened.

If only the amino group-containing monomer is used in the present invention, a crosslinking acceleration action is exerted, but the crosslinking reaction excessively proceeds (sheet aging). As a result, reduction of tack of the resulting pressure-sensitive adhesive is brought about, and besides, wet heat stability is lowered. Therefore, such a pressure-sensitive adhesive is unsuitable as a pressure-sensitive adhesive composition for an optical member. However, in the case where large amounts of amide groups are allowed to be present as crosslinking groups and the proportion of the amino groups is low, such a problem as above does not occur.

The pressure-sensitive adhesive composition of the present invention substantially contains no metal chelate-based curing agent. That is to say, by using a metal chelate-based curing agent, a pressure-sensitive adhesive composition having a short aging period can be obtained, but the pressure-sensitive adhesive obtained as above is conspicuously lowered in durability, particularly heat resistance. In this connection, even if a metal chelate-based curing agent is present in the pressure-sensitive adhesive composition on a level such that it is usually contained as an impurity (in a slight amount), this conforms to the case where "the pressure-sensitive adhesive composition substantially contains no metal chelate-based curing agent" in the present invention.

DETAILED DESCRIPTION OF THE INVENTION

Next, the pressure-sensitive adhesive composition for an optical member of the present invention is described in detail.

The pressure-sensitive adhesive composition for an optical member of the present invention is a pressure-sensitive adhesive composition favorable for sticking a film or a plate, which is used by being stuck particularly to a surface of a liquid crystal device, e.g., an optical member, particularly a polarizing plate, a retardation film or a damage prevention film.

Although the pressure-sensitive adhesive composition for an optical member of the present invention may be in the form of a film or a plate, it usually has a thickness of 5 to 50 μm, preferably 10 to 30 μm, and in usual, a structure wherein a releasable film is allowed to adhere to each surface of a pressure-sensitive adhesive layer is taken. The above structure is an example using no substrate, but a substrate may be provided, and on each surface of the substrate, the pressure-sensitive adhesive layer may be formed. As the substrate used herein, a resin film of high transparency, such as a film of poly(meth)alkyl acrylate, polyethylene terephthalate or polycarbonate, is preferably used. In this case, the thickness of the substrate is usually in the range of 10 to 500 μm, preferably 50 to 200 μm. When a substrate is provided, the thickness of each pressure-sensitive adhesive layer is in the range of 5 to 50 μm, preferably 10 to 30 μm.

The pressure-sensitive adhesive composition for an optical member of the present invention comprises an acrylic polymer and an isocyanate-based curing agent having an isocyanurate skeleton.

[Acrylic Polymer]

The acrylic polymer of the present invention contains (a) a monomer constituted of an alkyl acrylate monomer having an alkyl group of 1 to 12 carbon atoms and/or an aromatic ring-containing acrylic monomer, (b) an amide group-containing acrylic monomer and (c) a hydroxyl group-containing acrylic monomer.

[Monomer (a)]

The monomer (a) is constituted of an alkyl acrylate monomer having an alkyl group of 1 to 12 carbon atoms and/or an aromatic ring-containing acrylic monomer. That is to say, the monomer (a) may be constituted of only an alkyl acrylate monomer having an alkyl group of 1 to 12 carbon atoms, or may be constituted of only an aromatic ring-containing acrylic monomer, or may be constituted of a combination of them.

Examples of the alkyl acrylate monomers having an alkyl group of 1 to 12 carbon atoms include methyl(meth)acrylate, ethyl(meth)acrylate, propyl(meth)acrylate, isopropyl(meth)acrylate, butyl(meth)acrylate, isobutyl(meth)acrylate, pentyl (meth)acrylate, hexyl(meth)acrylate, 2-ethylhexyl(meth)acrylate, octyl(meth)acrylate, nonyl(meth)acrylate, decyl(meth)acrylate, dodecyl(meth)acrylate and lauryl(meth)acrylate. These monomers can be used singly or in combination. When the monomer (a) contains, as one constituent, an alkyl acrylate monomer having an alkyl group of 1 to 3 carbon atoms, such as methyl(meth)acrylate, ethyl(meth)acrylate or propyl(meth)acrylate, the resulting pressure-sensitive adhesive composition can exhibit light leakage prevention property.

Examples of the aromatic ring-containing acrylic monomers include phenyl acrylate, phenoxyethyl(meth)acrylate, benzyl(meth)acrylate, phenoxydiethylene glycol(meth)acrylate, ethylene oxide-modified nonylphenol(meth)acrylate, hydroxyethylated β-naphthol acrylate and biphenyl(meth) acrylate. These monomers can be used singly or in combination. When the monomer (a) contains the aromatic ring-containing acrylic monomer as one constituent, the resulting pressure-sensitive adhesive composition can exhibit excellent light leakage prevention property. The amount of the monomer (a) added is 80 to 98.7% by weight of the acrylic polymer, preferably 85 to 97.35% by weight thereof.

[Amide Group-Containing Acrylic Monomer (b)]

The amide group-containing acrylic monomer (b) to constitute the acrylic polymer of the present invention is an acrylic monomer having an amide group or an N-substituted amide group in a molecule. Examples of the monomers (b) include (meth)acrylamide, (meth)acryloylmorpholine, N-methylol(meth)acrylamide, N-methoxyethyl(meth)acrylamide, N,N-dimethyl acrylamide and N-isopropyl acrylamide. These monomers can be used singly or in combination. The amount of the amide group-containing acrylic monomer (b) added is 0.2 to 1.5% by weight of the acrylic polymer, preferably 0.5 to 1% by weight thereof. These monomers can be used singly or in combination.

[Hydroxyl Group-Containing Acrylic Monomer (c)]

Specific examples of the hydroxyl group-containing acrylic monomers (c) to constitute the acrylic polymer of the present invention include 2-hydroxyethyl(meth)acrylate, 2-hydroxyethylpropyl(meth)acrylate, 3-chloro-2-hydroxypropyl(meth)acrylate, 4-hydroxybutyl(meth)acrylate, 6-hydroxyhexyl(meth)acrylate and 8-hydroxyoctyl(meth)acrylate. The amount of the hydroxyl group-containing acrylic monomer (c) added is 1 to 5% by weight of the acrylic polymer, preferably 2 to 4% by weight thereof. These monomers can be used singly or in combination.

[Other Monomers]

In addition to the above monomers (a) to (c), other monomers may be added to the acrylic polymer of the present invention within limits not detrimental to the properties required, and specifically, monomers having a carboxyl group in a molecule can be mentioned. Specific examples of the monomers having a carboxyl group in a molecule include (meth)acrylic acid, 2-carboxyethyl(meth)acrylate, 3-carboxypropyl(meth)acrylate, 4-carboxybutyl(meth)acrylate, itaconic acid, crotonic acid, maleic acid, fumaric acid and maleic anhydride. The amount of other monomers added is 0.1 to 13.5% by weight of the acrylic polymer, preferably 0.15 to 10% by weight thereof. These monomers can be used singly or in combination.

[Isocyanate-Based Crosslinking Agent (d) Having Isocyanurate Skeleton]

The isocyanate-based curing agent having an isocyanurate skeleton, which is the component (d) for use in the present invention, is a compound containing, in a molecule, an isocyanurate group formed by trimerization of an isocyanate group, and there are various derivatives. The component (d) is not specifically restricted provided that it is an isocyanate-based compound having an isocyanurate skeleton. The component (d) can be obtained by, for example, a process described in Japanese Patent Laid-Open Publication No. 1996-193114 or International Publication No. 2006/137307 Pamphlet, and for example, Colonate 342 and Colonate 2030 (each available from Nippon Polyurethane Industry Co., Ltd.), etc. are on the market.

Of the components (d), a tolyene diisocyanate-based compound is particularly preferable because it has positive birefringence and therefore has high light leakage prevention property.

In the present invention, the isocyanate-based curing agent having an isocyanurate skeleton is used as a curing agent in an amount of 0.12 to 1 part by weight, preferably 0.14 to 0.5 part by weight, based on 100 parts by weight of the acrylic polymer. By allowing such an amount of the isocyanate-based curing agent having an isocyanurate skeleton to undergo reaction, phenomena undesirable for liquid crystal devices, such as light leakage, can be prevented.

The amide group incorporated into the acrylic polymer probably exhibits catalytic action, and by virtue of this, the reaction of such an isocyanate-based curing agent having an isocyanurate skeleton with the hydroxyl group likewise incorporated into the acrylic polymer is accelerated. As a result, a crosslinked structure is formed in a short time. Thus, a pressure-sensitive adhesive having excellent heat resistance and wet heat resistance is presumed to be formed. Hence, the pressure-sensitive adhesive composition for an optical member of the present invention can be processed after the aging step of short time.

[Silane Coupling Agent]

To the pressure-sensitive adhesive composition for an optical member of the present invention, a silane coupling agent can be added in addition to the above components. Examples of the silane coupling agents include polymerizable unsaturated group-containing silicon compounds, such as vinyltrimethoxysilane, vinyltriethoxysilane and methacryloxypropyltrimethoxysilane, silicon compounds having an epoxy structure, such as 3-glycidoxypropyltrimethoxysilane, 3-glycidoxypropylmethyldimethoxysilane and 2-(3,4-epoxycyclohexyl)ethyltrimethoxysilane, and 3-chloropropyltrimethoxysilane. Of these, silicon compounds having an epoxy structure are preferable. The amount of the silane coupling agent added is usually 0.05 to 1.0 part by weight, preferably 0.05 to 0.6 part by weight, based on 100 parts by weight of the acrylic polymer. These compounds can be used singly or in combination.

In the preparation of the pressure-sensitive adhesive composition for an optical member of the present invention, a publicly known preparation process can be adopted. For example, processes of solution polymerization, bulk polymerization, emulsion polymerization, seed polymerization, etc. can be adopted. Particularly in the case of the solution polymerization, after the polymerization is carried out using a reaction solvent in the presence of a catalyst, the reaction solvent can be used as a coating solvent without removing the reaction solvent. Further, the bulk polymerization is preferable because the polymerization can be carried out without substantially using a solvent. Since the monomers for use in the present invention have extremely good reactivity, the charge ratio exactly becomes a composition ratio of the polymer.

Examples of the solvents, which are employable when the polymerization is carried out by the solution polymerization in the present invention, include ethyl acetate, toluene and methyl ethyl ketone. As the catalyst, a usual catalyst used in the preparation of an acrylic polymer can be used.

The polymerization reaction is usually carried out by purging the reaction container with an inert gas such as nitrogen gas. The reaction temperature is usually 50 to 100° C., preferably 60 to 80° C., though it varies depending upon the solvent used.

The pressure-sensitive adhesive composition for an optical member is usually applied to a base in the form of a film or a plate, followed by processing. That is to say, the pressure-sensitive adhesive composition for an optical member of the present invention is applied to a releasable film having been subjected to release treatment, and to this coated surface, a releasable film is further allowed to adhere, followed by processing. The pressure-sensitive adhesive composition for an optical member of the present invention can be used also for forming a pressure-sensitive adhesive layer on each surface of a proper substrate.

In particular, the pressure-sensitive adhesive composition for an optical member of the present invention is favorable for sticking a polarizing plate, a retardation film, a surface protective film, etc. which are used for forming a liquid crystal device. When such films related to liquid crystals are stuck, the thickness of the pressure-sensitive adhesive composition for an optical member of the present invention is usually in the range of 5 to 50 μm, preferably 10 to 30 μm.

The glass transition temperature of the pressure-sensitive adhesive composition of the present invention, as determined by the FOX's formula, is in the range of −60 to −20° C., preferably −55 to −30° C. The result of a 180° peel test of the pressure-sensitive adhesive composition of the present invention is usually in the range of 2 to 20 N/25 mm, preferably 3 to 10 N/25 mm, and the pressure-sensitive adhesive composition is excellent also in reworkability.

[Optical Member]

The optical member of the present invention is not specifically restricted, and it is a member which is in the form of a plate, a sheet, a film or the like and is stuck particularly to a surface of a liquid crystal device, e.g., a polarizing plate, a retardation film, an elliptical polarizing plate, an anti-reflection film, a luminance improving film, a light diffusion film, a glass scattering prevention film or a surface protective film.

EXAMPLES

The pressure-sensitive adhesive composition for an optical member of the present invention is further described with reference to specific examples, but it should be construed that the present invention is in no way limited to those examples.

Preparation Example 1

Preparation of Acrylic Polymer (1)

In a flask equipped with a stirring device, a nitrogen gas feed pipe, a thermometer and a reflux cooling pipe, 86.3 parts by weight of butyl acrylate, 10 parts by weight of phenoxyethyl acrylate, 0.2 part by weight of acrylic acid, 3 parts by weight of 2-hydroxyethyl acrylate, 0.5 part by weight of acrylamide and 160 parts by weight of ethyl acetate were placed, and while feeding nitrogen gas into the flask, the contents in the flask were heated to 68° C. Subsequently, in the flask thoroughly purged with nitrogen gas, 0.1 part by weight of AIBN was introduced while stirring the contents. Then, while maintaining the temperature of the contents in the flask at 68 to 69° C., reaction was performed for 6 hours. After the lapse of 6 hours, 130 parts by weight of ethyl acetate were added to the reaction mixture. The weight-average molecular weight (Mw) and the number-average molecular weight (Mn) of the resulting acrylic polymer (1) were measured under the following GPC measurement conditions, and the degree of dispersion (Mw/Mn) was determined. The non-volatile content (nV) and the viscosity were also measured by the following methods. The measurement results and the monomer composition are set forth together in Table 1.

<GPC Measuring Device>

Measuring device: HLC-8120GPC (manufactured by Tosoh Corporation)

GPC column constitution: the following 5 serially connected columns (all manufactured by Tosoh Corporation)

(1) TSK-GEL HXL-H (guard column)
(2) TSD-GEL G7000HXL
(3) TSK-GEL GMHXL
(4) TSK-GEL GMHXL
(5) TSK-GEL G2500HXL Sample concentration: the sample was diluted with tetrahydrofuran so that the concentration might become 1.0 mg/cm$^3$.

Mobile phase solvent: tetrahydrofuran

Flow rate: 1 ml/min

Column temperature: 40° C.

<Measuring Method for Nonvolatile Content>

In a tin Petri dish (n1) precisely weighed, about 1 g of the acrylic polymer was placed, and the total weight (n2) was precisely weighed, followed by heating at 105° C. for 3 hours. Thereafter, this tin Petri dish was allowed to stand still in a desiccator at room temperature for 1 hour, and then, precise weighing was carried out again to measure the total weight (n3) after heating. Using the resulting measured weight values (n1 to n3), a nonvolatile content was calculated from the following formula.

Nonvolatile content(%)=100×[weight after heating (n3−n1)/weight before heating(n2−n1)]

<Viscosity Measurement>

Viscosity of the acrylic polymer was measured at room temperature using a B type viscometer.

Preparation Examples 2 to 14

Preparation of Acrylic Polymers (2) to (14)

Acrylic polymers (2) to (14) were obtained in the same manner as in Preparation Example 1, except that the monomer composition was changed to that shown in Table 1. Then, Mw, Mn, nonvolatile content and viscosity of these acrylic polymers were measured in the same manner as in Preparation Example 1. The results are set forth in Table 1.

Example 1

Preparation of Pressure-Sensitive Adhesive Composition

To 100 parts by weight of the acrylic polymer (1) obtained in Preparation Example 1, 0.15 part by weight of Colonate 342 (available from Nippon Polyurethane Industry Co., Ltd.) as a tolylene diisocyanate-based curing agent having an isocyanurate skeleton and 0.2 part by weight of A-50 (available from Soken Chemical & Engineering Co., Ltd.) as a silane coupling agent were added, and they were sufficiently mixed to obtain a pressure-sensitive adhesive composition.

Examples 2 to 15

Pressure-sensitive adhesive compositions were obtained in the same manner as in Example 1, except that the acrylic polymer, the crosslinking agent and the silane coupling agent were changed as shown in Table 2.

Comparative Examples 1 to 11

Pressure-sensitive adhesive compositions were obtained in the same manner as in Example 1, except that the acrylic

TABLE 1

Table 1: Synthesis example for acrylic polymer

|  | (1) | (2) | (3) | (4) | (5) | (6) | (7) | (8) |
|---|---|---|---|---|---|---|---|---|
| BA | 86.3 | 85.9 | 85.9 | 46.3 | 66.3 | 45.8 | 65.8 | 66.3 |
| MA |  |  |  | 50 | 30 | 50 | 30 | 20 |
| POA | 10 | 10 |  |  |  |  |  | 10 |
| BzA |  |  | 10 |  |  |  |  |  |
| AA | 0.2 | 0.2 | 0.2 | 0.2 | 0.2 | 0.2 | 0.2 | 0.2 |
| 2HEA | 3 | 3 | 3 | 3 | 3 | 3 | 3 | 3 |
| AM | 0.5 | 1 | 0.5 | 0.5 | 0.5 | 1 | 1 | 0.5 |
| DMAA |  |  |  |  |  |  |  |  |
| DM |  |  |  |  |  |  |  |  |
| Nonvolatile content (%) | 25.2 | 25.1 | 24.9 | 24.8 | 25.0 | 24.9 | 24.9 | 25.3 |
| Viscosity (Pa·s) | 4.6 | 4.3 | 4.4 | 12.3 | 8.9 | 12.6 | 9.1 | 7.2 |
| Mw | 860,000 | 825,000 | 841,000 | 812,000 | 831,000 | 854,000 | 826,000 | 808,000 |
| Mw/Mn | 25.6 | 27.1 | 24.1 | 24.3 | 22.6 | 24.9 | 24.7 | 25.4 |

|  | (9) | (10) | (11) | (12) | (13) | (14) |
|---|---|---|---|---|---|---|
| BA | 86.3 | 96.3 | 96.8 | 84.8 | 86.7 | 86.3 |
| MA |  |  |  |  |  |  |
| POA | 10 |  |  | 10 | 10 | 10 |
| BzA |  |  |  |  |  |  |
| AA | 0.2 | 0.2 | 0.2 | 0.2 | 0.2 | 0.2 |
| 2HEA | 3 | 3 | 3 | 3 | 3 | 3 |
| AM |  | 0.5 |  | 2 | 0.1 |  |
| DMAA | 0.5 |  |  |  |  |  |
| DM |  |  |  |  |  | 0.5 |
| Nonvolatile content (%) | 25.1 | 25.2 | 24.8 | 24.7 | 25.0 | 24.8 |
| Viscosity (Pa·s) | 4.3 | 4.1 | 7.2 | 4.8 | 3.8 | 3.9 |
| Mw | 832,000 | 840,000 | 980,000 | 810,000 | 807,000 | 765,000 |
| Mw/Mn | 26.0 | 25.3 | 9.9 | 26.1 | 24.0 | 27.4 |

BA: butyl acrylate
MA: methyl acrylate
POA: phenoxyethyl acrylate
BzA: benzyl acrylate
AA: acrylic acid
2HEA: 2-hydroxyethyl acrylate
AM: acrylamide
DMAA: N,N-dimethylacrylamide
DM: N,N-dimethylaminoethyl methacrylate polymer, the crosslinking agent and the silane coupling agent were changed as shown in Table 3.

Test Example 1

Aging Test

After the pressure-sensitive adhesive compositions obtained in Examples 1 to 15 and Comparative Examples 1 to 11 were each applied and dried, the number of days required for stabilizing the change in gel fraction of each of the pressure-sensitive adhesives was measured, and the aging property was evaluated by the resulting number of days. The results are set forth in Table 2 and Table 3. The measuring method for gel fraction was carried out in the following manner.

<Measuring Method for Gel Fraction>

The resulting pressure-sensitive adhesive composition was applied to a surface of a PET film having been subjected release treatment so that the dry thickness of the layer of the composition might become 20 μm, and then dried. Thereafter, to the other surface of the pressure-sensitive adhesive composition thus applied, a PET film having been likewise subjected to release treatment was allowed to adhere, whereby a specimen was obtained. The specimen was stored at 23° C. and 50% RH, and after the beginning of storage (0 day), the following operations were carried out every day. About 0.1 g of the pressure-sensitive adhesive was picked from the specimen into a sample bottle, and 30 cc of ethyl acetate was added and allowed to penetrate into the pressure-sensitive adhesive for 24 hours. Thereafter, the contents in the sample bottle were filtered off through a stainless steel wire net of 200 meshes and dried on the wire net at 100° C. for 2 hours, and a weight of the residue was measured as a dry weight. Based on the resulting values, a gel fraction was determined by the following formula.

Gel fraction(%)=(dry weight/weight of pressure-sensitive adhesive picked)×100

The gel fractions in Table 2 and Table 3 indicate measured values of gel fractions after completion of aging and stabilization.

Test Example 2

Using the pressure-sensitive adhesive compositions obtained in Examples 1 to 15 and Comparative Examples 1 to 11, polarizing plates with pressure-sensitive adhesive were prepared, and heat resistance, wet heat resistance, light leakage prevention property and sheet aging property of the polarizing plates with pressure-sensitive adhesive were evaluated in the following manner. The results are set forth together in Tables 2 and 3.

(Preparation of Polarizing Plate with Pressure-Sensitive Adhesive)

After bubble removal, the pressure-sensitive adhesive composition was applied onto a PET film having been subjected to release treatment using a doctor blade and immediately dried at 90° C. for 3 minutes, and this was allowed to adhere to a polarizing plate. In order to sufficiently stabilize the change in gel fraction of the pressure-sensitive adhesive on the polarizing plate, the polarizing plate with the pressure-sensitive adhesive was allowed to stand still for 5 days under the conditions of 23° C. and 50% RH to prepare a specimen.

<Heat Resistance/Wet Heat Resistance Test>

The above specimen was cut to a size of 60 mm×120 mm, then the PET film was peeled off, and the specimen was allowed to adhere to a glass substrate. Then, the specimen was allowed to stand for 500 hours at 85° C. under the dry conditions (heat resistance test) or allowed to stand for 500 hours at 60° C. and 95% RH (wet heat resistance test), and foaming, lifting and peeling having occurred in the specimen were visually observed to evaluate heat resistance and wet heat resistance.

AA: Bad appearances, such as foaming, lifting and peeling, were not observed.

BB: Bad appearances, such as foaming, lifting and peeling, were slightly observed.

CC: Bad appearances, such as foaming, lifting and peeling, were obviously observed.

<Light Leakage Test>

From each of two specimens prepared as above, the PET film was peeled off, and the specimens were allowed to adhere to the front and back surfaces of a glass substrate, respectively, by the use of a laminator roll so that they might be in a crossed Nicols state, and then, they were kept for 20 minutes in an autoclave having been adjusted to 50° C. and 5 atm. Subsequently, these specimens were allowed to stand for 500 hours under the conditions of 85° C., and light leakage prevention property was visually observed. As for the values of the light leakage test, the luminance at the center of the screen was taken as A, the luminance at the position of 1 cm far from the corner was taken as B, and the light leakage prevention property was evaluated by the ratio of the luminance at the corner B to the luminance at the center A, namely, the formula X=B/A. That is to say, as the value of X is decreased, the light leakage prevention property becomes more excellent.

<Sheet Aging Property Test>

From the above specimen, the PET film was peeled off, and the specimen was allowed to adhere to a glass substrate and stored for 1 month at 23° C. and 50% RH.

The value of tack at the beginning of storage was taken as A, the value of tack after the lapse of 1 month was taken as B, and the change ratio was determined by the formula Y=B/A× 100. The sheet aging property was evaluated by the value of Y (in Table 2, the expression "no change" indicates that the value of Y is within the range of 95 to 105%). The measuring method for tack was carried out in the following manner.

<Measuring Method for Tack>

The above polarizing plate specimen having been allowed to adhere to the glass substrate was pulled at a rate of 300 mm/min in the direction of 180° to the glass substrate to measure a peel strength, and the tack was evaluated by the peel strength.

TABLE 2

Table 2: Preparation example for pressure-sensitive adhesive composition and results of various tests

| | Acrylic polymer | Ex. 1 (1) | Ex. 2 (2) | Ex. 3 (3) | Ex. 4 (4) | Ex. 5 (5) | Ex. 6 (6) | Ex. 7 (7) | Ex. 8 (8) |
|---|---|---|---|---|---|---|---|---|---|
| Isocyanate curing agent | Colonate 342 Colonate 2030 Takenate D-110N Colonate L | 0.15 | 0.15 | 0.15 | 0.3 | 0.3 | 0.3 | 0.3 | 0.3 |

TABLE 2-continued

Table 2: Preparation example for pressure-sensitive adhesive composition and results of various tests

| | | | | | | | | | |
|---|---|---|---|---|---|---|---|---|---|
| Chelate curing agent | NACEM Alumi | | | | | | | | |
| Silane coupling agent | A-50 | 0.2 | 0.2 | 0.2 | 0.2 | 0.2 | 0.2 | 0.2 | 0.2 |
| | KBM-403 | | | | | | | | |
| Curing catalyst | U-860 | | | | | | | | |
| Heat resistance test | | AA | AA | AA | AA | AA | AA | AA | AA |
| Wet heat resistance test | | AA | AA | AA | AA | AA | AA | AA | AA |
| Light leakage test | | 1 | 1 | 1 | 2 | 2 | 2 | 2 | 1 |
| Tack change ratio (sheet aging property) | | no change | no change | no change | no change | no change | no change | no change | no change |
| Gel fraction (%) | | 58 | 62 | 60 | 61 | 68 | 67 | 70 | 62 |
| Number of days of aging (day) | | 1 | 1 | 1 | 1 | 1 | 1 | 1 | 1 |

| | Acrylic polymer | Ex. 9 (9) | Ex. 10 (10) | Ex. 11 (1) | Ex. 12 (1) | Ex. 13 (1) | Ex. 14 (4) | Ex. 15 (4) |
|---|---|---|---|---|---|---|---|---|
| Isocyanate curing agent | Colonate 342 | 0.2 | 0.2 | 0.15 | 0.8 | | 0.8 | |
| | Colonate 2030 | | | | | 0.2 | | 0.2 |
| | Takenate D-110N | | | | | | | |
| | Colonate L | | | | | | | |
| Chelate curing agent | NACEM Alumi | | | | | | | |
| Silane coupling agent | A-50 | 0.2 | 0.2 | | 0.2 | 0.2 | 0.2 | 0.2 |
| | KBM-403 | | | 0.2 | | | | |
| Curing catalyst | U-860 | | | | | | | |
| Heat resistance test | | AA | AA | AA | AA | AA | AA | AA |
| Wet heat resistance test | | AA | AA | AA | AA | AA | AA | AA |
| Light leakage test | | 1 | 3 | 1 | 1 | 1 | 2 | 2 |
| Tack change ratio (sheet aging property) | | no change | no change | no change | no change | no change | no change | no change |
| Gel fraction (%) | | 58 | 61 | 59 | 74 | 60 | 72 | 57 |
| Number of days of aging (day) | | 1 | 1 | 1 | 1 | 1 | 1 | 1 |

Colonate 342: isocyanurate type modified tolylene diisocyanate-based curing agent, available from Nippon Polyurethane Industry Co., Ltd.
Colonate 2030: isocyanurate type tolylene diisocyanate-based curing agent, available from Nippon Polyurethane Industry Co., Ltd.
Takenate D-110N: trimethylolpropane adduct type xylene diisocyanate-based curing agent, available from Takeda Pharmaceutical Co., Ltd.
Colonate L: trimethylolpropane adduct type tolylene diisocyanate-based curing agent, available from Nippon Polyurethane Industry Co., Ltd.
NACEM Alumi: aluminum acetylacetonate type curing agent, available from Nihon Kagaku Sangyo Co., Ltd.
A-50: silane coupling agent, available from Soken Chemical & Engineering Co., Ltd.
KBM-403: silane coupling agent, available from Shin-Etsu Chemical Co., Ltd.
U-860: organotin-based curing accelerator, available from Nitto Kasei Co., Ltd.

TABLE 3

Table 3: Preparation example for pressure-sensitive adhesive composition and results of various tests

| | Acrylic polymer | Comp. Ex. 1 (1) | Comp. Ex. 2 (1) | Comp. Ex. 3 (1) | Comp. Ex. 4 (1) | Comp. Ex. 5 (11) | Comp. Ex. 6 (11) | Comp. Ex. 7 (13) | Comp. Ex. 8 (14) | Comp. Ex. 9 (12) | Comp. Ex. 10 (1) | Comp. Ex. 11 (4) |
|---|---|---|---|---|---|---|---|---|---|---|---|---|
| Isocyanate curing agent | Colonate 342 | | 0.1 | 1.5 | 0.1 | | | | 0.3 | 0.15 | 0.15 | |
| | Colonate 2030 | | | | | | | | | | | |
| | Takenate D-110N | 0.3 | | | | 0.12 | 0.12 | | | | | |
| | Colonate L | | | | | | | | | | 0.15 | 0.15 |
| Chelate curing agent | NACEM Alumi | | | | 0.5 | | | | | | | |
| Silane coupling agent | A-50 | 0.2 | 0.2 | 0.2 | 0.2 | 0.2 | 0.2 | 0.2 | | 0.2 | 0.2 | 0.2 |
| | KBM-403 | | | | | | | | 0.2 | | | |
| Curing catalyst | U-860 | | | | | | 0.1 | | | | | |
| Heat resistance test | | AA | CC | AA | CC | AA | AA | AA | AA | AA | AA | AA |
| Wet heat resistance test | | AA | BB | CC | AA | AA | BB | AA | CC | CC | AA | AA |
| Light leakage test | | 2.5 | 2 | 4 | 2 | 8 | 8 | 1 | 1 | 1 | 1 | 1 |
| Tack change ratio (sheet aging property) | | no change | no change | no change | no change | no change | no change | no change | 20% | no change | no change | no change |
| Gel fraction (%) | | 67 | 53 | 78 | 68 | 64 | 75 | 64 | 60 | 71 | 68 | 65 |
| Number of days of aging (day) | | 4 | 2 | 1 | 1 | 5 | 2 | 3 | 2 | 1 | 4 | 4 |

Colonate 342: isocyanurate type modified tolylene diisocyanate-based curing agent, available from Nippon Polyurethane Industry Co., Ltd.
Colonate 2030: isocyanurate type tolylene diisocyanate-based curing agent, available from Nippon Polyurethane Industry Co., Ltd.
Takenate D-110N: trimethylolpropane adduct type xylene diisocyanate-based curing agent, available from Takeda Pharmaceutical Co., Ltd.
Colonate L: trimethylolpropane adduct type tolylene diisocyanate-based curing agent, available from Nippon Polyurethane Industry Co., Ltd.
NACEM Alumi: aluminum acetylacetonate type curing agent, available from Nihon Kagaku Sangyo Co., Ltd.
A-50: silane coupling agent, available from Soken Chemical & Engineering Co., Ltd.
KBM-403: silane coupling agent, available from Shin-Etsu Chemical Co., Ltd.
U-860: organotin-based curing accelerator, available from Nitto Kasei Co., Ltd.

<Consideration>

By the above test results, it has been indicated that the number of days of aging of the pressure-sensitive adhesive composition of the present invention obtained by adding an isocyanate-based curing agent having an isocyanurate skeleton to an acrylic polymer containing an amide group-containing acrylic monomer as a constituent can be significantly reduced as compared with that of the pressure-sensitive adhesive composition prepared by adding an isocyanate-based curing agent that is not an isocyanurate type.

Moreover, it has been indicated that the pressure-sensitive adhesive composition prepared by adding an isocyanate-based curing agent having an isocyanurate skeleton to an acrylic polymer containing an amino group-containing acrylic monomer as a constituent is inferior in wet heat resistance as compared with the pressure-sensitive adhesive composition of the present invention, and besides, sheet aging property appears conspicuously and steep reduction of tack is brought about.

In the case of the pressure-sensitive adhesive composition of the present invention, the aging period required can be significantly shortened, and as a result, various costs required for long-term aging can be reduced. Moreover, since the pressure-sensitive adhesive composition of the present invention exhibits excellent light leakage prevention property, is excellent in heat resistance and wet heat resistance and is free from sheet aging, it is preferably used for optical members, particularly polarizing plates.

The invention claimed is:

1. A pressure-sensitive adhesive composition for an optical member, obtained by blending:
   100 parts by weight of an acrylic polymer containing:
   80 to 98.7 parts by weight of (a) a monomer constituted of an alkyl acrylate monomer having an alkyl group of 1 to 12 carbon atoms and/or an aromatic ring-containing acrylic monomer,
   0.2 to 1.5 parts by weight of (b) an amide group-containing acrylic monomer, and
   1 to 5 parts by weight of (c) a hydroxyl group-containing acrylic monomer,
   with
   0.12 to 1 part by weight of (d) an isocyanate-based curing agent having an isocyanurate skeleton as a curing agent,
   said pressure-sensitive adhesive composition substantially containing no metal chelate-based curing agent,
   said isocyanate-based curing agent (d) having an isocyanurate skeleton being a tolylene diisocyanate-based curing agent, and
   said alkyl acrylate monomer having an alkyl groups of 1 to 12 carbon atoms comprises an alkyl acrylate monomer having an alkyl group of 1 to 3 carbon atoms and an alkyl acrylate monomer having an alkyl group of 4 to 12 carbon atoms.

2. The pressure-sensitive adhesive composition for an optical member as claimed in claim 1, wherein the monomer (a) contains at least an aromatic ring-containing acrylic monomer.

3. An optical member which is an optical member in the form of a film, a sheet or a plate and has the pressure-sensitive adhesive composition for an optical member as claimed in claim 1 on at least one surface thereof.

4. An optical member which is an optical member in the form of a film, a sheet or a plate and has the pressure-sensitive adhesive composition for an optical member as claimed in claim 2 on at least one surface thereof.

* * * * *

UNITED STATES PATENT AND TRADEMARK OFFICE
CERTIFICATE OF CORRECTION

| | |
|---|---|
| PATENT NO. | : 9,080,085 B2 |
| APPLICATION NO. | : 14/117726 |
| DATED | : July 14, 2015 |
| INVENTOR(S) | : Seiji Yokokura et al. |

It is certified that error appears in the above-identified patent and that said Letters Patent is hereby corrected as shown below:

In The Claims
Column 16, Line 11, Claim 1, delete "groups" and insert -- group --

Signed and Sealed this
Ninth Day of February, 2016

Michelle K. Lee
*Director of the United States Patent and Trademark Office*